(12) United States Patent
Sanders

(10) Patent No.: US 6,650,128 B2
(45) Date of Patent: Nov. 18, 2003

(54) METHOD AND APPARATUS FOR CIRCUIT FAULT DETECTION WITH BOILER WATER LEVEL DETECTION SYSTEM

(75) Inventor: Gary G. Sanders, Rock Falls, IL (US)

(73) Assignee: Tyco Flow Control, Prophetstown, IL (US)

( * ) Notice: Subject to any disclaimer, the term of this patent is extended or adjusted under 35 U.S.C. 154(b) by 68 days.

(21) Appl. No.: 10/078,599

(22) Filed: Feb. 19, 2002

(65) Prior Publication Data

US 2003/0155938 A1 Aug. 21, 2003

(51) Int. Cl.[7] .................. G01R 27/08; G08B 21/00; G01F 23/00
(52) U.S. Cl. .................. 324/715; 324/693; 340/620; 73/304 R
(58) Field of Search .................. 324/715, 693, 324/697, 662; 340/450, 618, 620; 73/290 R, 304 R, 304 L

(56) References Cited

U.S. PATENT DOCUMENTS

| | | | |
|---|---|---|---|
| 3,935,739 A | * 2/1976 | Ells | .................. 73/304 C |
| 4,020,488 A | 4/1977 | Martin et al. | |
| 4,224,606 A | 9/1980 | Bartles | |
| 4,482,891 A | 11/1984 | Spencer | |
| 4,646,569 A | 3/1987 | Cosser | |
| 4,692,591 A | 9/1987 | Cooley et al. | |
| 4,773,274 A | * 9/1988 | Kobayashi et al. | .................. 73/861.16 |
| 4,792,660 A | 12/1988 | Cooley et al. | |
| 5,271,280 A | * 12/1993 | Nissen | .................. 73/861.16 |
| 5,519,639 A | 5/1996 | Jordan et al. | |
| 5,565,851 A | 10/1996 | Richards et al. | |
| 5,801,307 A | * 9/1998 | Netzer | .................. 73/170.17 |
| 6,118,190 A | 9/2000 | Richards | |

OTHER PUBLICATIONS

PG–60 Design and Application Requirements for Miscellaneous Pipe, Valves, and Fittings.

* cited by examiner

Primary Examiner—N. Le
Assistant Examiner—Timothy J. Dole
(74) Attorney, Agent, or Firm—Browning Bushman P.C.; C. James Bushman

(57) ABSTRACT

A fault detection circuit in a boiler-water level system includes a dual-frequency signal generator which develops two AC components with no associated DC component. The two frequencies are mixed and sent through an impedance matching circuit to match the impedance of the signal generating portion of the system with the impedance of the boiler water under measurement. The impedance-matched signal is then directed to two legs, one leg directed through one of a plurality of electrode probes and then to a first filter circuit, and the other leg is directed a second set of filters. In combination, the filters pass either the higher or the lower of the two frequencies to determine an open or short condition in the level sensing circuitry, as well as a steam vs. water condition.

15 Claims, 1 Drawing Sheet

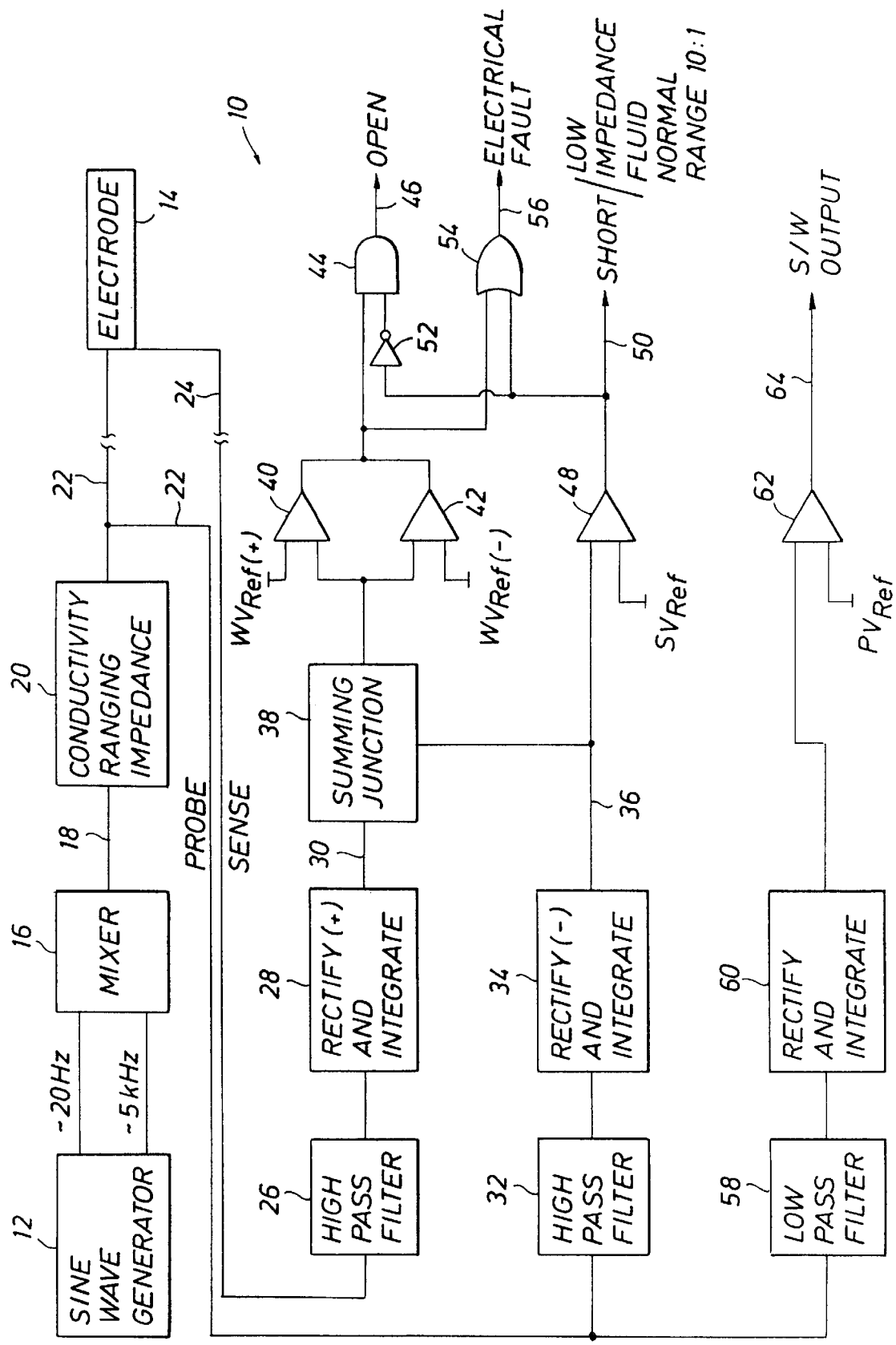

METHOD AND APPARATUS FOR CIRCUIT FAULT DETECTION WITH BOILER WATER LEVEL DETECTION SYSTEM

BACKGROUND OF THE INVENTION (1) Field of the Invention

The present invention relates generally to the field of boiler water level detectors and, more particularly to systems for the detection of electrical faults, as well as water versus steam detection, in boiler water level detectors.

(2) Description of Related Art

The control of water level in a steam boiler is extremely critical, in that if a fire tube is exposed, a boiler explosion could result. The rate of thermal conductance from a fire tube by water is many times greater than that of steam, thus if steam blankets the tube, there is insufficient heat conduction from the tube and the tube rapidly overheats. In order to avoid this potentially catastrophic occurrence, steam systems are required to provide redundant water level indicators for each boiler.

One common solution to the requirement for redundant water level indicators has for some time included two independent visual level indicators. Such visual level indicators require penetrations for top and bottom of the indicators and a sight glass in which the level of water is visually apparent. However, boilers typically operate at high temperatures and pressures, often at a normal operating pressure of 3,000 psi. This factor presents an engineering challenge to make the sight glasses robust in such a hostile environment. As a consequence, sight glasses often leak, and a small leak at such a high pressure can quickly develop into a serious problem.

In recognition of this problem, standards setting organizations, such as for example the ASME, have provided alternative standards for providing redundant level indications. For example, one such redundant visual indicator may be isolated and an electronic level indication used instead. Such electronic level indications must themselves be robust and ideally are redundant, typically parallel circuitry, and not scanned, polled or multiplexed systems, but fully independent systems. However, electronic level indicators present challenges in design all their own due to the high temperatures involved. A typical electrical-type level indicator uses a water column system with spaced-apart conductive electrodes (also referred to as probes), with the water column mounted directly to the side of the boiler. An electrical potential is impressed across each of the spaced-apart electrodes, and the current is measured. If water is present between the conductors, the low impedance of the water results in a relatively high measured current. Conversely, steam is much less conductive, and thus if steam is present between the conductors, the high impedance results in a relatively low measured current. Commonly the higher current is used to illuminate one color or type of lamp, and the lower current illuminates another color or type of lamp, thus presenting to an operator an easily visible level indication. Additional logic circuitry may provide steam over water error indication, high and low level trip points, alarms, pre-alarms, displays, relay closures, SSR conduction, and other indications.

Some such electrical level indicators use a low DC potential with an impressed square wave periodic signal impressed upon it. The DC potential may cause hydrolysis of the water, and can result in explosive concentrations of hydrogen and oxygen within the steam system or electroplating. Thus, there remains a need for an electronic level indication system for boilers that avoids the hydrolysis problem.

Further, standards setting organizations have mandated various self-diagnostic features, such as for example power supply monitoring, clock function monitoring, electrode short detection, open wiring detections, and water over steam detection. Many systems have been offered to serve these various functions, but there remains a need in the art to provide an integrated electronic system which can effectively detect a circuit short, a circuit open, and/or a water vs. steam condition, wherein the electronic system sensing circuit has no direct current component which may cause hydrolysis.

Martin el al., in U.S. Pat. No. 4,020,488, described an apparatus for indicating when the value of a parameter lies above or below a predetermined limit. The apparatus includes two or more sensors each arranged to provide a warning signal when the parameter lies beyond a respective specified value, the value for at least one of the sensors being equal to or beyond the predetermined limit; and logic means including a validation circuit connected to the two sensors and arranged to provide a "parameter-beyond-limit" signal. This signal may be used to operate an alarm and/or an emergency trip, only when both sensors provide a warning signal. Various forms of apparatus are described in which the parameter sensed is the level of water in various items of a steam plant as used in power stations to provide an indication of high and/or low water level.

Bartles, in U.S. Pat. No. 4,224,606, describes a fluid level control circuit with a safety test function for a boiler water level probe of a fail safe type. The control circuit is connected to a field effect transistor controlled amplifier having a well defined threshold of operation. A safety test switch is provided to pull the amplifier's input down below the threshold point, but not to a shorted condition. By observing the output of the system, it is possible to determine whether the fluid level detector is properly installed, and whether the amplifier has had any type of unsafe operating failure.

Spencer, in U.S. Pat. No. 4,482,891, describes a robust electronic liquid level gauge apparatus, particularly suitable for use with boiler drum water column. The apparatus comprises simple probe sensors in the water column, differential amplifier sensors, detectors responsive only to the simultaneous presence of a minimum level signal and a certain frequency, and logic circuits continuously processing outputs from four detectors: its associated probe detector, the one below, and the two above.

Cosser, in U.S. Pat. No. 4,646,569, describes a fluid level measurement system for the measurement of a level of fluid in a vessel. The electrical impedance of a first conduction path between a central rod electrode and a surrounding cylindrical electrode and the electrical impedance of the second conduction path between the cylinder and the vessel are established. The first conduction path is restricted to be below the minimum fluid level by an insulating coating on the rod. The second conduction path varies with the fluid level. An output signal is extracted from the electrodes potentiometrically which is indicative of the fluid level. The signal may be linearized by application to a circuit having a matched non-linear transfer function. With this arrangement, a continuous output signal indicative of the fluid level is produced which is not subject to errors due to changes in fluid resistivity.

Colley et al., in U.S. Pat. No. 4,692,591, describe a controller for controlling an electrode boiler steam humidifier, of the type operable from a source of polyphase alternating current. A plurality of current loop transformers, coupled to the boiler electrodes, sense the individual currents drawn in each phase of the polyphase alternating current. A plurality of full-wave bridge rectifiers individually couple the secondaries of the current loop transformers to the input of a voltage amplifier such that the output of the amplifier is indicative of the highest of the currents sensed in each phase of the boiler electrode current. When the output of the voltage amplifier exceeds a predetermined threshold, a control effect is produced such that operation of the humidifier is controlled in accordance with the highest of the individual phase currents drawn through each of the boiler electrodes.

Similarly, Colley et al., in U.S. Pat. No. 4,792,660, describe a controller for controlling an electrode boiler steam humidifier. The controller includes a plurality of current loop transformers, coupled to the boiler electrodes, for sensing the current drawn by the electrode boiler. A current level detector provides a control voltage to a solenoid controlled valve, associated with the boiler, to drain a predetermined quantity of water from the boiler and thereby reduce the electrode current, when the electrode current exceeds a predetermined upper current limit. A resettable counter is provided for limiting the number of automatic attempts which can be made to reduce the electrode current. Normal periodic actuation of the humidistat resets the counter to avoid reaching the predetermined count through long-term acquisition of isolated over-current occurrences. During normal operation of the boiler, the time required for the electrode current to decrease between a pair of predetermined current levels is monitored and is compared against a known reference in order to provide a general indication of the condition of the boiler.

Jordan et al., in U.S. Pat. No. 5,519,639, describe a system for monitoring the water level of a pressure drum having a pressure column. The monitoring system comprises a plurality of electrodes communicating with the column for contacting water and steam within the column. Each electrode has its own location and produces a first output which corresponds to the presence of water or a second output which corresponds to the presence of steam. A discriminator is operatively connected to the electrodes and the discriminator has an analog-to-digital converter for receiving the output of each electrode and converting the output to a digital signal. The digital signal represents the water conductivity for each electrode. A central processor is connected to the discriminator for powering the discriminator as well as for receiving the digital signals in order to determine a slope degradation between the conductivity and the location of each electrode in the column. The central processor also determines an inflection point between the water and the steam in the column. An LED display is used to indicate which of the electrodes are located in water and which of the electrodes are located in steam.

Richards et al, in U.S. Pat. No. 5,565,851, describe a fluid level sensing system, particularly for sensing the water level in a steam generating boiler. The sensing system comprises a vessel connected to the boiler so as to contain water and steam at substantially the same level as in the boiler, a number of vertically spaced electrodes projecting into the vessel, and circuitry for measuring the electrical impedance sensed by each electrode. The circuitry, which can be multiplexed to each electrode in turn, includes a first comparator for producing an output when the sensed impedance lies between the normal maximum impedance of the water and the normal minimum impedance of the steam above the water, this output being demultiplexed to drive a vertical display to show the level of the steam/water interface. The circuitry additionally includes a second comparator for producing a further output when the sensed impedance lies below the normal minimum impedance of the water, which further output is indicative of a variety of different fault conditions and drives a fault indicator.

And finally, Richards, in U.S. Pat. No. 6,118,190, describes a circuit for controlling a fail-safe operation of measurement and control apparatus for detecting the presence or absence of water by making a measurement of the impedance experienced in a gap between an insulated tip of the electrode and a surface held at a reference voltage or else connected to ground. The apparatus may be configured to provide an alarm when water is present and should not be, or vice versa. The circuit comprises comparators, a phase detector, and a triple-redundant drive circuit which drives a relay. One comparator ensures that when operating with water as the normal condition, an electrode fault, such as could be caused by excessive contamination, will cause the system output to indicate an abnormal condition. Another comparator discriminates between the water condition and the steam condition. Yet another comparator ensures that there is no output if there exists an abnormal condition or any fault condition. It follows that there will only be an output if the sensor is in the normal condition. This is then shown to operate a relay using a secure triple redundancy drive circuit so that the relay contacts may be used to indicate a normal or an abnormal/fault condition.

However, the art does not describe a system which includes a dual frequency sensing signal which develops no direct current aspect, and which is used to indicate an open circuit condition, or short circuit condition on the same sense line, as well as boiler level measurements and a fault indicator, all within the same sensing circuit.

It is therefore an object of the present invention to sense for an open and/or a short circuit condition, as well as a water vs. steam condition with a single system. It is a further object of this invention to provide a method of sensing for an open and/or a short circuit condition, and a water vs. steam condition, with a single circuit. It is also an object of this invention to provide for sensing such conditions with a circuit with a net sum integral zero signal applied to the electrode probes to eliminate the possibility of hydrolysis within the boiler system.

SUMMARY OF THE INVENTION

The present invention addresses these and other needs in the art by providing a dual-frequency signal generator which develops two AC components with no associated DC component. The two frequencies are mixed and sent through an impedance matching circuit to match the impedance of the signal generating portion of the system with the impedance of the boiler water under measurement.

The impedance-matched signal is then directed to two legs, one leg directed through one of a plurality of electrode probes and then to a first filter circuit, and the other leg is directed a second set of filters. In combination, the filters pass either the higher or the lower of the two frequencies to determine an open or short condition in the level sensing circuitry, as well as a steam over water condition.

These and other features and advantages of the present invention will be apparent to those skilled in the art from a review of the following detailed description along with the accompany drawings.

BRIEF DESCRIPTION OF THE DRAWING FIGURE

The appended drawing illustrates only a typical, preferred embodiment of this invention and is therefore not to be considered limiting of its scope, for the invention may admit to other equally effective embodiments.

The only drawing FIGURE is a schematic drawings of the preferred embodiment of the present invention for a single electrode level.

DETAILED DESCRIPTION OF A PREFERRED EMBODIMENT

The drawing FIGURE depicts a preferred embodiment of the present invention, wherein a circuit fault detection system 10 is provided. The system 10 begins conceptually with a periodic signal generator 12, preferably a dual frequency sine wave generator. The signal generator 12 provides two frequencies, which are not multiplexed, but rather are superimposed on one another. The lower of the two frequencies, for example about 20 Hz, is used for the measurement of the presence of water or steam at the specific level of an electrode or probe 14 and the higher of the two frequencies, for example about 5 KHz, is used for detection of circuit fault. The lower frequency is used for fluid level detection because water, particularly boiler water with its boiler water chemistry, is not purely resistive, and thus presents a reactive impedance. The reactive impedance of the boiler water would develop erroneous measurements at higher frequencies. The higher frequency of 5 KHz was selected to provide an easily generated and controlled frequency and because it is far enough away from the lower frequency so that simple filters can easily distinguish between them. Since this frequency is used to detect wiring errors, any phase shift caused by the reactance of the water is of no consequence.

The dual frequency signals, at relatively low AC voltage with no DC component, are provided to a mixer 16 which simply superimposes the two signals onto a single conductor 18. The superimposed signals are directed to a conductivity ranging impedance circuit 20, which functionally is an adjustable resister. The conductivity ranging impedance circuit 20 is adjusted to match the impedance of the water in the boiler, which can vary substantially with its chemistry.

Two lines branch from the conductivity ranging impedance circuit 20, one labeled "probe", or line 22, and one labeled "sense", or line 24, in the FIGURE. As shown in the FIGURE, the probe line defines the dual-frequency signal before it passes through the probe 14, and the sense line defines the signal after it passes through the probe. The probe line 22 sends the mixed signal to the electrode or probe 14, which presents a high impedance if steam is present at the probe and a low impedance if water is present. The sense line 24 continues from the probe 14 to a high pass filter 26, which filters out the low frequency (20 Hz) component. The higher frequency component passes from the filter 26 to a positive going rectifier and integrator 28, which develops a first measurement signal on a signal line 30. As used herein, the term "positive going rectifier" refers to a rectifier which blocks the negative going portion of a periodic waveform, and passes the positive going portion. Conversely, a "negative going rectifier" refers to a rectifier which block the positive going portion of such a waveform, and passes the negative going portion.

As previously described, the conductivity ranging impedance circuit 20 also provides a probe line 22. The probe line 22 feeds a high pass filter 32, which like the filter 26 filters the low frequency component and passes the higher frequency, or 5 KHz component. The filter 32 feeds the higher frequency component to a negative going rectifier and integrator 34, which develops a second measurement signal on a signal line 36. The first measurement signal on the signal line 30 and the second measurement signal on the signal line 36 are fed to a summing junction 38. If the two measurement signals fed into the summing junction 38 are equal, this provides a clear indication that no open circuit exists in the circuitry to and from electrode.

The summing junction feeds a pair of parallel comparators 40 and 42. The comparator 40 is biased by a window reference voltage, $W_{VRef(+)}$, while the comparator 42 is biased by a window reference voltage, $W_{VRef(-)}$. The comparators 40 and 42 feed one of the inputs to an AND gate 44 as one of the inputs to indicate an open circuit at an output 46.

Returning now to the negative going rectifier and integrator 34, the second measurement signal on the signal line 36 is also fed to a comparator 48. The other input to the comparator 48 is provided by a reference voltage $S_{VRef}$, which is equal to the expected voltage level from the rectifier 34, unless a short develops in the electrode circuitry. In the event of a short, the comparator 48 develops a signal to a short indicator 50, which nominally is set at a factor of 10:1 from the impedance measurement of low impedance fluid under normal operations. This signal is also inverted by an inverter 52 and then fed to the other input to the AND gate 44 for the open indication. In a shorted condition, both the probe signal on conductor 36 and the sense signal on conductor 30 will be equal, sometimes causing both short and open outputs. By inverting the shorting signal 50 and logically ANDing it with the open signal from the window comparator 40, 42, this ambiguity is eliminated.

Most electrical panels operate on the concept of an unlit panel indicates normal operation, or red, yellow, and green indications mean immediate attention, greater observation, and normal operation, respectively. In order to reduce the number of indicators to an operator, the present invention provides an OR gate 54. If either an open or a short in the operational circuitry is detected, then a signal is developed by the OR gate 54 to simply indicate to the operator on an electrical fault line 56 that an out of specification condition exists and for him to take action.

Finally, in addition to the high pass filter 32, the probe line 22 also feeds a low pass filter 58. The low pass filter 58 filters the high frequency component out of the signal and provides the low frequency component (20 Hz) to a rectifier and integrator 60 to develop a level indication signal. The rectifier and integrator 60 feeds the level indication signal to a comparator 62. A relatively high impedance from the electrode indicates the presence of steam at the electrode, and a relatively low impedance indicates water. The comparator 62 is biased by a reference $P_{VRef}$, and provides a signal on an S/W output 64. The voltage level of this output will determine whether a steam indicator or a water indicator is lit for the benefit of the operator.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A sensing circuit for a boiler level indicator having a level probe, the circuit comprising:

a. a dual frequency signal generator;

b. a first high pass filter coupled to the signal generator through the probe;

c. a second high pass filter coupled to the signal generator;

d. a positive going rectifier coupled to the first high pass filter to develop a positive sense level;

e. a negative going rectifier coupled to the second high pass filter to develop a negative sense level; and f. a summing junction to receive the positive and negative sense level and to develop a summed output, wherein equal positive and negative sense levels at the summing junction indicates that no open circuit exists in the sensing circuit.

2. The sensing circuit of claim 1, further comprising a comparator, biased by a predetermined short voltage and coupled to the negative going rectifier, to develop a short indication on a predetermined difference between the negative sense level and the short voltage.

3. The sensing circuit of claim 1, further comprising a boiler chemistry comparator, biased by a predetermined boiler water impedance voltage and coupled to the negative going rectifier, to develop an out of specification boiler water chemistry indication on a predetermined difference between the negative sense level and the boiler water impedance voltage.

4. The sensing circuit of claim 1, further comprising a low pass filter coupled to the signal generator to develop a signal indicative of a steam vs. water condition at the probe.

5. The sensing circuit of claim 4, further comprising a frequency mixer to couple the signal generator to the low pass filter.

6. The sensing circuit of claim 4, further comprising a. a low pass filter rectifier to receive the signal indicative of a steam vs. water condition and to develop a rectified signal indicative of a steam vs. water condition; and b. a steam over water comparator, biased by a steam vs. water voltage reference, to develop a steam vs. water indication on a predetermined difference between the rectified signal indicative of a steam vs. water condition and the steam over water voltage reference.

7. The sensing circuit of claim 1, further comprising a frequency mixer to couple the signal generator to the first and second high pass filters.

8. The sensing circuit of claim 1, wherein the signal generator develops two sine waves.

9. The sensing circuit of claim 8, further comprising a frequency mixer to impress the two sine waves onto a conductor.

10. The sensing circuit of claim 1, further comprising a window comparator coupled to the summing junction to receive the summed output and to compare the summed output to a window reference voltage, thereby developing an open signal indication on a predetermined difference between the summed output and the window reference voltages.

11. The sensing circuit of claim 1, wherein the signal generator develops a dual frequency signal defining a net sum integral zero signal level.

12. A method of analyzing a boiler level circuit of a boiler, comprising the steps of:

a. developing a dual frequency signal having a higher frequency element and a lower frequency element;

b. passing the dual frequency signal through a boiler level probe to develop a sense signal;

c. filtering the lower frequency element from the sense signal;

d. filtering the lower frequency element from the dual frequency signal; and e. analyzing the filtered sense signal and the dual frequency signal to determine if an open condition exists in the boiler level circuit.

13. The method of claim 12, further comprising the step of comparing the filtered dual frequency signal to a short reference signal to determine if a short condition exists in the boiler level circuit.

14. The method of claim 12, further comprising the steps of:

a. filtering the higher frequency element from the dual frequency signal; and b. comparing the filtered dual frequency signal to a reference steam over water reference to determine if a steam over water condition exists in the boiler.

15. The method of claim 12, wherein higher frequency element and a lower frequency element define a net sum integral zero signal level.

* * * * *